(No Model.)

N. BOSMANN.
DETACHABLE LINK.

No. 434,498. Patented Aug. 19, 1890.

Witnesses.
Wm. M. Rheem.
J. R. Andrews.

Inventor.
Nicolas Bosmann
By Elliott and Onohundro
Atty's.

UNITED STATES PATENT OFFICE.

NICOLAS BOSMANN, OF CHICAGO, ILLINOIS.

DETACHABLE LINK.

SPECIFICATION forming part of Letters Patent No. 434,498, dated August 19, 1890.

Application filed November 22, 1889. Serial No. 331,186. (No model.)

*To all whom it may concern:*

Be it known that I, NICOLAS BOSMANN, a citizen of the United States, residing in Chicago, in the county of Cook and State of Illinois, have invented certain new and useful Improvements in Detachable-Link Chains, of which the following is a specification.

This invention relates to improvements in detachable-link chains, in which each of the links is provided with an opening in the side bar of a width corresponding with the thickness of the adjacent link, which opening is of such a character and removed at such a point from the bearing of the links upon each other when the chain is stretched and the links are in their operative position that said links cannot be accidentally detached, although readily separated when desired.

The prime object of this invention is to have each link so constructed that the opening in the side bar will be closed after the links are once united, and closed in such a manner that no amount of slack in the chain can by any possibility permit the accidental passage of the links through said opening, or their accidental detachment at any time or when in any position that they are capable of relative to each other, while at the same time both parts are rigidly held against spreading at their opening.

The further object of this invention is a two-part link the parts of which may be readily and quickly detached from each other, but which when united are securely locked together against any accidental detachment, which locking together is promoted by the adjacent links in addition to the locking force due to the conformation of the individual locking devices of said two parts.

A further object is a two-part detachable-link the locking devices of which are of such a character that they may be readily and economically cast with the link, and which require no special finishing for successful use; and, finally, to provide certain new details of construction tending to promote the effectiveness of the locking devices, all as is hereinafter described, and shown in the accompanying drawings, in which—

Figure 1:
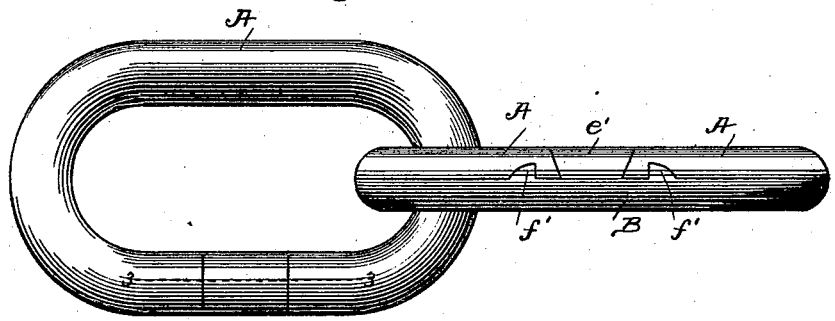
Figure 2:
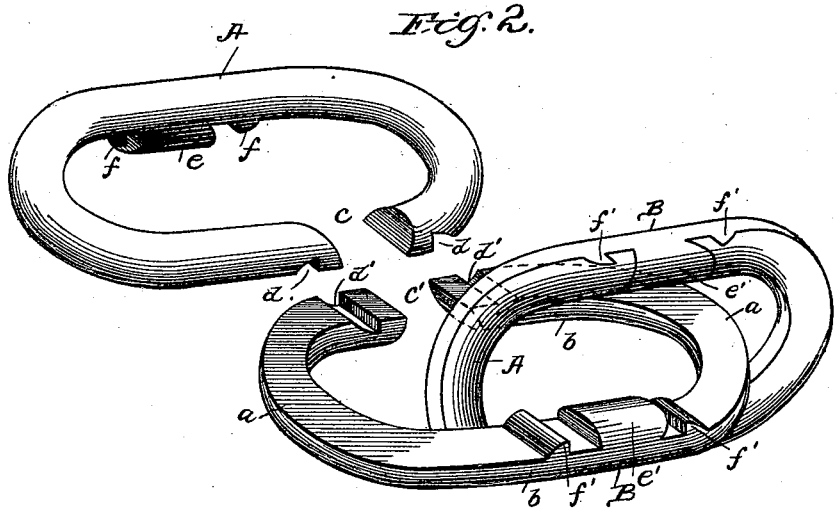
Figure 3:
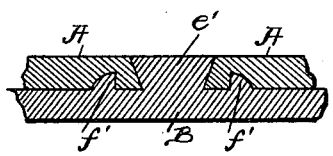

Figure 1 represents a front elevation of two links embodying my invention when united together in their operative condition; Fig. 2, a perspective of the same, showing one of the links in its operative position, with the two parts of the other link separated but in position to be united with each other and in proper relation to the other link. Fig. 3 is a detail longitudinal section on the line 3 3 of Fig. 2, for illustrating the form of locking devices.

Similar letters of reference indicate the same parts in the several figures of the drawings.

The links embodying my invention are shown as of the ordinary oval form and substantially round in cross-section; but this is merely for the purposes of illustrating my invention, which is not confined to any particular form of links, for it is obvious that the links may be angular or round and also angular in cross-sections. In either form of link, however, they have what may be said to be "end bars" *a a* and "side bars" *b b*, and each of said links composed of two longitudinal halves A and B, which when united together as now to be described, form a practical continuous link. The part A has an opening *c* and the part B an opening *c'* in their side bars, each of which openings is of a width sufficiently greater than the diameter of the adjacent links to permit the same to be passed through them. On each side of this opening and on their inner faces the one link is provided with transverse notches *d d*, and the other link with similar notches *d' d'*, as clearly shown in Fig. 2. Directly opposite this opening and in the other side bar of the link and cast therewith is a dovetailed projection *e* on the one link and *e'* on the other part of the link, at each end of which are smaller wedge-shaped projections *f f* on the one part and *f' f'* on the other part, which projections *f* and *f'* respectively correspond with and are adapted to fit into the recesses *d* and *d'* next the opening in the other side bar of these parts, the ends of the side bars adjacent to the opening being inclined to correspond with the dovetailing of the projections *e* and *e'* on the opposite side of the side bar, as more clearly shown in Fig. 3. With this construction of the links it will be seen that if the two parts of the link be held in position, as shown in Fig. 2, it will be seen that if the two parts be held in practically the same plane and moved toward each other the projection e' will pass into and fit the opening c in the link A, and the projections f' fit into the notches d on either side of said opening, while at the same time the dovetailed projection e will enter the opening c' in the part B and the projection f likewise enter the notches d' in the same part.

As shown by the inner face of the half-link in Fig. 2 the opposing side walls of the projections e f f, and also of the projections e' f' f'', converge toward each other, thereby forming a wedge-like groove or notch, in which form the corresponding projections at the ends of the opposing half-links, whereby the projections can only enter grooves or notches from one direction and are prevented moving past each other, while at the same time two half-links may be tightly wedged together. Substantially the same wedging effect, however, results without converging the side walls of the projections e e', for obviously with said walls straight and the opposing walls of the projections f' f'' converging, the corresponding end projections at the ends of the opposing half-links would wedge between the straight walls of the projections e e' and the converging walls of the projections f f and f' f''. In other words, so long as the projections f f and f' f'' have their inner walls converged with reference to the projections e e', the converging of the inner walls of said projections e e' is broadly optional and merely arbitrary, although to a limited degree the converging of both walls tends to promote the locking effect.

From the foregoing it will be understood that so far as the wedging of the two parts of the links together and the preventing of their spreading apart are concerned, the absence of the projections e e' would not reduce these effects, and therefore that the principal function of the projections e e' is to preserve the continuity of appearance of the links. In other words, my invention, broadly stated, is a split link, each part of which has an opening in one of its side bars, which side bars are prevented from spreading by corresponding projections and grooves on each side of said openings, and the two parts held against an accidental lateral movement by a wedge-like connection between said projections and groove. In conclusion, it may be observed that these projections and grooves, and also the openings and the projections e e', are of such form that the links may be cast, stamped, or rolled out into form. After uniting the two parts of a link, as above described, such link may be introduced between the opening in one part of a similar link and then held in position, as shown in Fig. 2, after which the other part of the second link may be united with its corresponding part, as before described.

My invention, broadly stated, is a split link, each part of which has an opening in its side bar, and each part provided with a projection closing said openings and having locking devices for uniting said parts against accidental detachment.

Having described my invention, what I claim, and desire to secure by Letters Patent, is—

A split link comprising two C-shaped members, each of said members being provided with wedge-shaped grooves across the inner flat face thereof at a point removed from the side openings, and the closed sides of said members provided with central projections to close the openings, and with wedge-shaped projections on each side of the central projections to fit the opposing grooves, substantially as described.

NICOLAS BOSMANN.

Witnesses:
R. C. OMOHUNDRO,
W. R. OMOHUNDRO.